United States Patent [19]
Garnish et al.

[11] 3,868,255
[45] Feb. 25, 1975

[54] DIAZONIUM SALTS AND DIAZOTYPE MATERIALS

[75] Inventors: Sidney George Garnish; Rafiqul Islam, both of London, England

[73] Assignee: GAF Corporation, New York, N.Y.

[22] Filed: Feb. 12, 1973

[21] Appl. No.: 331,854

Related U.S. Application Data

[63] Continuation of Ser. No. 56,732, July 20, 1970, abandoned.

[30] Foreign Application Priority Data

July 23, 1969 Great Britain .................... 37095/67

[52] U.S. Cl. ...................... 96/91 R, 96/49, 260/141
[51] Int. Cl. ....................... G03g 1/54, C07c 113/04
[58] Field of Search ........ 96/91 R, 75, 49; 260/141, 260/142

[56] References Cited
UNITED STATES PATENTS

| | | | |
|---|---|---|---|
| 2,980,534 | 4/1961 | Printy et al. .................... | 96/49 X |
| 3,028,240 | 4/1962 | Werner et al. .................... | 96/91 R |
| 3,311,475 | 3/1967 | VanLoon et al. .................... | 96/91 R |
| 3,338,713 | 8/1967 | Hendrickx et al. .................. | 96/91 R |
| 3,397,985 | 8/1968 | Hendrick .......................... | 96/91 R |
| 3,407,066 | 10/1968 | Mustacchi et al. .................. | 96/91 R |
| 3,416,925 | | Sus et al. ........................ | 96/91 R |
| 3,442,651 | 5/1969 | Hendrickx et al. .................. | 96/91 R |
| 3,442,652 | 5/1969 | Hectors et al. .................... | 96/91 R |
| 3,520,692 | 7/1970 | Knoester et al. ................... | 96/91 R |
| 3,547,637 | 12/1970 | Scheler et al. .................... | 96/75 X |

FOREIGN PATENTS OR APPLICATIONS

| | | | |
|---|---|---|---|
| 1,177,545 | 1/1970 | Great Britain ...................... | 96/91 R |
| 1,534,978 | 7/1967 | France ............................ | 96/91 R |

*Primary Examiner*—Charles L. Bowers, Jr.
*Attorney, Agent, or Firm*—Walter C. Kehm; Samson B. Leavitt

[57] ABSTRACT

Diazotizable amines of the general formula

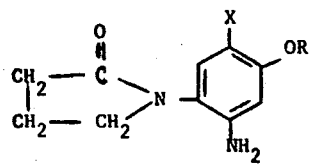

wherein R is substituted or unsubstituted alkyl, hydroxyalkyl, aryl, or aralkyl, and X is a radical of the formula

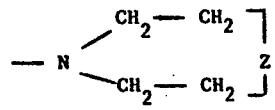

wherein Z is a direct linkage, a divalent atom, or a divalent radical.

10 Claims, No Drawings

DIAZONIUM SALTS AND DIAZOTYPE MATERIALS

This is a continuation of application Ser. No. 56,732, filed July 20, 1970, now abandoned.

The present invention relates to improved diazotype materials and to amines and diazonium compounds derived from such amines suitable for use in diazotype materials.

In the past, various diazonium compounds have been used to manufacture diazotype materials and it has been found that the desirable diazonium compounds for such applications are those which are very sensitive to the light of mercury vapour lamps, both fluorescent and non-fluorescent. The diazonium compounds used should advantageously be thermally stable and yield dark colors with coupling components in the presence of a suitable developer, e.g. an alkaline developer such as ammonia vapour.

A primary object of this invention is to make use of diazonium compounds which offer special advantages in respect of improved light-sensitivity, ease of manufacture, improved stability, and are of wider applicability compared to diazonium compounds previously known for the present purpose.

According to one aspect of this invention we provide amines having the general formula:

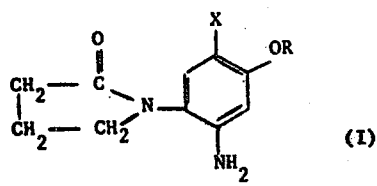

wherein R is substituted or unsubstituted alkyl, hydroxy alkyl, aryl or aralkyl, and X is an optionally substituted radical

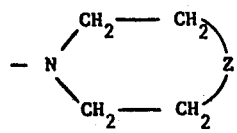

wherein Z is a divalent linkage (pyrrolidino radical) or a divalent atom or divalent radical. For example, Z may be —O— (morpholino radical, —CH$_2$—(-piperidino radical) or —NH—(piperazino radical).

According to another aspect of this invention we provide diazonium compounds derived from the amines (I) and having the general formula:

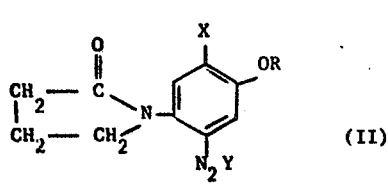

in which X and R are as defined above and Y is an anion. Preferably Y is chloride, sulphate or a complex anion such as zinc chloride double salt.

This invention also provides a diazotype material comprising a light-sensitive layer containing a diazonium compound as defined above.

The use of the above-defined diazonium compounds offer advantages over the compounds disclosed in U.S. Pat. No. 3,407,066 as follows:

1. The synthetic route for producing the present diazonium compounds is shorter and simpler. We have found that on certain occasions it is extremely difficult to isolate a diazonium salt in which a tertiary nitrogen is in ortho position to the diazonium group. However, in the case of the present diazonium compounds, the presence of a carbonyl group in the 5 membered heterocyclic ring makes the diazonium salt extremely easy to isolate.

2. As a consequence of the relative ease of preparation of these compounds, they are generally cheaper to produce commercially.

3. The light-sensitivity of these compounds is as high as for the compounds disclosed in U.S. Pat. No. 3,407,066, but the thermal stability is greater. Diazotype papers based on the present diazonium compounds have a better shelf life than when the diazonium compounds disclosed in U.S. Pat. No. 3,407,066 are used.

4. When used with yellow, brown or red couplers the dyes formed have a very high actinic absorption in the ultra-violet range of wave-lengths; in addition, some of the dyes formed have deep dark brown colors. These two properties which are emphasized with the present diazonium compounds are particularly suited for producing master intermediate prints on translucent materials such as cellulose film, polyester film, transparent paper and cloth or transparentised paper.

Some examples of diazonium compounds embodying the present invention are those derived from the following amines:

2-(N-pyrrolid-2'-one-yl)-4-piperidino-5-methoxy-aniline, 2-(N-pyrrolid-2'-one-yl)-4-morpholino-5-methoxy-aniline, 2-(N-pyrrolid-2'-one-yl)-4-pyrrolidino-5-methoxy-aniline, 2-(N-pyrrolid-2'-one-yl)-4-(N-methyl-piperazino)-5-methoxy-aniline.

A method for preparing the amines (I) as defined above comprises condensing a compound having the general formula:

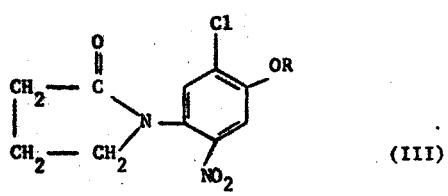

with an optionally substituted amine having in the unsubstituted form the general formula

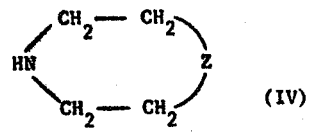

in which Z is as defined above to form a compound (V) having the general formula (III) but in which —Cl is replaced by the optionally substituted radical

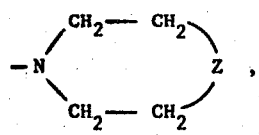

and reducing the compound (V) to form the amine (I) as defined above.

Upon diazotising in a manner known per se the amines (I) are converted into the diazonium compounds (II).

Compound (III) where R is $CH_3$ may be obtained by nitrating 2-chloro-4-(N-pyrrolid-2'one-yl)-anisole and the latter compound may be obtained by a condensation reaction between butyro-lactone and 2-chloro-4-amino-anisole.

The preparation of 2-(N-pyrrolid-2'-one-yl)-4-piperidino-methoxy-aniline may be carried out as follows: a mixture of 2-chloro-4-amino-anisole and a few drops of concentrated sulphuric acid in excess butyrolactone is refluxed for 8 hours in a round bottom flask fitted with a mechanical stirrer, an air condenser, a thermometer and a receiving flask, the rate of reflux is controlled by adjusting the bath temperature so that the thermometer gives a reading between 100°C to 115°C and a distillate is collected in the receiving flask. After 8 hours of simultaneous reflux and distillation as described above the mixture is poured into water. The solid is isolated washed with water and recrystallised from alcohol to give colorless needles of 2-chloro-4-(N-pyrrolid-2'-one-yl)-anisole, m.p. 84°–85°C. The 2-chloro-4-(N-pyrrolid-2'-one-yl)-anisole is dissolved in glacial acetic acid and nitrated with a mixture of concentrated nitric acid and sulphuric acid in the usual way and the mixture is poured into water. The solid is collected, washed with water and recrystallised from alcohol to give yellow needles of 2-(N-pyrrolid-2'-one-yl)-4-chloro 5-methoxy-nitrobenzene. m.p. 122°C. The 2-(N-pyrrolid-2'-one-yl)-4-chloro-5-methoxy-nitrobenzene is refluxed for 10 hours with excess piperidine and the mixture then poured into water. The solid is isolated, washed with water and recrystallised from alcohol to give bright yellow crystals of 2-(N-pyrrolid-2'-one-yl)-4-piperidino-5-methoxy-nitrobenzene, m.p. 136°C which on catalytic hydrogenation give 2-(N-pyrrolid-2'-one-yl)-4-piperidino-5-methoxy-aniline. The amine can be diazotised in the usual way and the diazonium compound can be isolated as complex salt of zinc chloride, tin chloride, borofluoride.

Similar condensation reactions of 2-(N-pyrrolid-2'-one-yl)-4-chloro 5-methoxy nitrobenzene (Formula III) morpholine and pyrrolidine give the following compounds respectively: 2-(N-pyrrolid-2'-one-yl) 4-morpholino 5-methoxy nitrobenzene, and 2-(N-pyrrolid-2'-one-yl) 4-pyrrolidino 5-methoxy nitrobenzene, m.p. 150°C. A similar condensation reaction with N-methyl-piperazine gives 2-(N-pyrrolid-2'-one-yl)-4-(N-methyl-piperazino)-5-methoxy-nitrobenzene, m.p. 220°C.

These nitro compounds can be reduced, diazotised and diazo compounds are isolated as complex salts of chloride, tin chloride, and borofluoride in the usual manner.

The following examples illustrate the present invention and are not to be regarded as limitative. All parts and properties referred to herein and in the appended claims are by weight unless otherwise indicated.

EXAMPLE 1

A white base paper is coated with a sensitizing liquid having the following composition:

| | | |
|---|---|---|
| Water | 100 | ml. |
| Tartaric acid | 2 | g. |
| Thiourea | 3 | g. |
| 2-(Pyrrolid-2'-one-yl)-4-pyrrolidino-5-methoxy benzene diazonium chloro zincate | 1.5 | g. |
| Zinc chloride | 2 | g. |
| 2,7-Dihydroxy naphthalene - 3,6-disulphonic acid, disodium salt | 1 | g. |
| Urea | 3 | g. |

The coated paper covered by a "master" tracing is exposed to a mercury vapour lamp to obtain a latent image. The paper is developed by gaseous ammonia to obtain a deep, bright blue image on a white background.

EXAMPLE 2

A white base paper is coated with a sensitizing liquid having the following composition:

| | | |
|---|---|---|
| Water | 100 | ml. |
| Tartaric acid | 2 | g. |
| Thiourea | 4 | g. |
| Diethylene glycol | 3 | ml. |
| 3:5 Dihydroxy N-2'-hydroxy ethyl benzamide | 1.5 | g. |
| 2-(Pyrrolid-2'-one-yl)-4-morpholino-5-methoxy benzene diazonium chloro zincate | 1.7 | g. |

The coated paper is exposed in the manner described in Example 1 and developed by gaseous ammonia. The resultant copy showed a dense red image on a white background.

EXAMPLE 3

On a polyethylene terephthalate film of the type marketed by I.C.I. Ltd. under the trade name "Melinex" is coated a layer of cellulose acetate butyrate. The film so obtained is subsequently coated with a sensitizing liquid having the following composition:

| | | |
|---|---|---|
| Ethyl alcohol (95%) | 80 | ml. |
| Methyl ethyl ketone | 20 | ml. |
| Citric acid | 2 | g. |
| 4:6 Dichloro-Resorcinol | 2.6 | g. |
| 2-(Pyrrolid-2'-one-yl)-4-piperidino-5-methoxy-benzene diazonium fluoborate | 2.6 | g. |

The coated polyester film is exposed and developed in the manner described in Example 1. The copy so obtained exhibits a deep sepia image on a clear background. The strong ultra-violet light absorption of the image enables the copy to be eminently suitable for use as an intermediate original in further copying processes upon light-sensitive coatings e.g. diazo papers.

EXAMPLE 4

A white base paper is coated with a sensitizing liquid having the following composition:

| | | |
|---|---|---|
| Water | 100 | ml. |
| Tartaric acid | 3 | g. |
| Diethylene glycol | 2 | ml. |
| 2,3-Dihydroxy naphthalene 6-sulphonic acid, sodium salt | 1 | g. |
| Thiourea | 4 | g. |
| Acetoacetanilide | 0.15 | g. |
| Resorcinol | 0.3 | g. |
| 2-(Pyrrolid-2'-one-yl)-4-pyrrolidino-5-methoxy benzene diazonium chloro zincate | 2.0 | g. |

The coated paper is exposed and developed as described in Example 1. The copy so obtained has a dense black image on a white background.

EXAMPLE 5

A transparent paper is coated with a sensitizing liquid having the following composition:

| | | |
|---|---|---|
| Water | 80 | ml. |
| Ethanol | 20 | ml. |
| Citric Acid | 2 | g. |
| Thiourea | 3 | g. |
| 2-(Pyrrolid-2'-one-yl)-4-piperidino-5-methoxy-benzene diazonium chloro zincate | 2.1 | g. |
| 4:6 Dichloro-Resorcinol | 2.5 | g. |

The resultant paper is exposed and developed as in Example 1. The copy so obtained exhibits a deep sepia image on a clear background. The light absorption of the image is such that excellent results are obtained when the copy is used as an 'intermediate master'.

EXAMPLE 6

A tracing paper having a partially hydrolysed cellulose acetate surface is coated with a sensitizing liquid of the following composition:

| | | |
|---|---|---|
| Water | 80 | ml. |
| Ethanol | 20 | ml. |
| Citric acid | 2 | g. |
| 2(N-Pyrrolid-2'-one-yl) 4-piperidino 5-methoxy benzene diazonium chloride stannic chloride salt | 5 | g. |

The resultant paper covered by a 'master' tracing is exposed to a mercury vapour lamp to obtain a latent image. The image is developed by applying onto the paper a developer liquid having the following composition:

| | | |
|---|---|---|
| Water | 568 | ml. |
| Phloroglucinol | 6.5 | g. |
| Resorcinol | 4.5 | g. |
| Thiourea | 4.5 | g. |
| Potassium Tetraborate | 35 | g. |
| Potassium hydroxide | 3.3 | g. |
| Sodium hydroxide | 0.45 | g. |
| Sodium isopropyl naphthalene sulphonate | 0.45 | g. |

The $p^H$ of the above liquid is 9.7

The developed print so obtained exhibits a bright sepia image on a clean background. Excellent results are obtained when the copy is used as an intermediate master.

This invention has been disclosed with respect to certain preferred embodiments, and it will be understood that modifications and variations thereof will become obvious to persons skilled in the art and are intended to be included within the spirit and purview of this application and the scope of the appended claims.

We claim:

1. Diazonium compounds of the general formula:

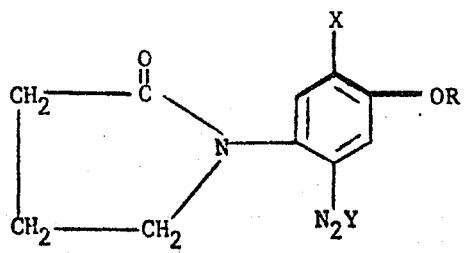

wherein R is selected from the group consisting of alkyl, hydroxyalkyl, aryl, or aralkyl, Y is an anion, and X is a radical selected from the group consisting of pyrrolidino, morpholino, piperidino and piperazino.

2. Diazotype materials comprising a support having a light-sensitive acid stabilized layer containing an azo coupler a light-sensitive diazonium compound taken from the group of compounds claimed in claim 1.

3. Compounds according to claim 1 wherein X is pyrrolidino.

4. Compounds according to claim 1 wherein X is morpholino.

5. Compounds according to claim 1 wherein X is piperidino.

6. Compounds according to claim 1 wherein X is piperazino.

7. Compounds according to claim 1 wherein R is methyl, X is pyrrolidino and Y is zinc chloride double salt.

8. Compounds according to claim 1 wherein R is methyl, X is morpholino and Y is zinc chloride double salt.

9. Compounds according to claim 1 wherein R is methyl, X is piperidino and Y is fluoborate.

10. A compound according to claim 1 wherein R is methyl, X is piperidino and Y is zinc chloride double salt.

* * * * *